United States Patent
Hosogoshi et al.

(10) Patent No.: US 10,554,844 B2
(45) Date of Patent: Feb. 4, 2020

(54) IMAGE SCANNING APPARATUS AND CONTROL METHOD FOR IMAGE SCANNING APPARATUS

(71) Applicant: CANON KABUSHIKI KAISHA, Tokyo (JP)

(72) Inventors: Hiroyuki Hosogoshi, Yokohama (JP); Miho Funabashi, Yokohama (JP); Norikazu Honda, Yokohama (JP); Masataka Iura, Ichikawa (JP); Yuichi Yanagiwara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/280,258

(22) Filed: Feb. 20, 2019

(65) Prior Publication Data

US 2019/0281179 A1 Sep. 12, 2019

(30) Foreign Application Priority Data

Mar. 8, 2018 (JP) .................... 2018-042303

(51) Int. Cl.
*H04N 1/00* (2006.01)
*H04N 1/407* (2006.01)

(52) U.S. Cl.
CPC ..... *H04N 1/00997* (2013.01); *H04N 1/00835* (2013.01); *H04N 1/407* (2013.01); *H04N 1/4076* (2013.01)

(58) Field of Classification Search
CPC ........... H04N 1/00997; H04N 1/00835; H04N 1/407; H04N 1/4076
See application file for complete search history.

(56) References Cited

U.S. PATENT DOCUMENTS

| 10,015,325 | B2 | 7/2018 | Honda | H04N 1/00037 |
| 2001/0026325 | A1* | 10/2001 | Iida | H04N 1/40 348/362 |
| 2010/0165423 | A1 | 7/2010 | Okuzono | 358/488 |
| 2015/0229810 | A1* | 8/2015 | Sugiyama | H04N 1/1017 358/504 |

FOREIGN PATENT DOCUMENTS

| EP | 2202956 | 6/2010 |
| JP | 2010-154229 | 7/2010 |

OTHER PUBLICATIONS

U.S. Appl. No. 16/145,771, filed Sep. 28, 2018.
Extended European Search Report dated Aug. 22, 2019 in counterpart EP Application 19156927.6.

* cited by examiner

*Primary Examiner* — Quang N Vo
(74) *Attorney, Agent, or Firm* — Venable LLP

(57) ABSTRACT

An image scanning apparatus determines whether there is an influence of external light from the outside of the image scanning apparatus on scanning; decides a correction value corresponding to each of a plurality of sensors based on received light amounts of at least some of the plurality of sensors; and corrects, using the correction value corresponding to each of the plurality of sensors and decided, data corresponding to a received light amount of each of the plurality of sensors when scanning the original, wherein if it is determined that there is the influence of the external light, the image scanning apparatus decides the correction value corresponding to a first sensor and the correction value corresponding to a second sensor arranged at a position that is readily influenced by the external light based on the received light amount of the first sensor.

13 Claims, 7 Drawing Sheets

IMAGE SCANNING APPARATUS AND CONTROL METHOD FOR IMAGE SCANNING APPARATUS

BACKGROUND OF THE INVENTION

Field of the Invention

The present invention relates to an image scanning apparatus and a control method for the image scanning apparatus.

Description of the Related Art

Conventionally, a flatbed image scanning apparatus scans a two-dimensional image by causing a one-dimensional sensor provided in a main-scanning direction to scan in a sub-scanning direction. An optical unit is formed by a light source for illuminating an original, optical parts such as a lens and a mirror for forming an image of light reflected by the original on a sensor, an image sensor formed by arranging elements each for photoelectrically converting light into an electrical signal, and the like. In this optical unit, shading occurs due to distribution unevenness caused by the characteristics of the lens, sensitivity unevenness of the image sensor, or the like. Therefore, when scanning an original, shading correction is normally performed based on shading correction data.

On the other hand, the flatbed image scanning apparatus poses a problem that when a thick original represented by a dictionary is to be scanned, an image is not scanned accurately. This is caused by interference of appropriate shading correction which occurs when external light is incident on the image sensor from a gap formed between the original and a platen glass on which the original is placed, thereby degrading the image quality reproducibility of the scanned image.

Japanese Patent Laid-Open No. 2010-154229 discloses control of determining whether external light is incident on an image sensor, and replacing, if external light is incident, parameters for shading by predetermined values.

However, when the parameters are replaced by the predetermined values, as described in Japanese Patent Laid-Open No. 2010-154229, if values which are not appropriate for an environment at the time of replacement are used, it is impossible to perform appropriate shading correction.

SUMMARY OF THE INVENTION

The present invention provides a technique of appropriately reducing the influence of external light on scanning of an original in consideration of the above problem.

According to one aspect of the present invention, there is provided an image scanning apparatus including an image scanning unit in which a plurality of sensors for scanning an original and a plurality of light sources are arranged in a predetermined direction, comprising: a determination unit configured to determine whether there is an influence of external light from the outside of the image scanning apparatus on scanning by the image scanning unit; a decision unit configured to decide a correction value corresponding to each of the plurality of sensors based on received light amounts of at least some of the plurality of sensors; and a correction unit configured to correct, using the correction value corresponding to each of the plurality of sensors and decided by the decision unit, data corresponding to a received light amount of each of the plurality of sensors when scanning the original, wherein if the determination unit determines that there is no influence of the external light, based on a received light amount of each of a first sensor and a second sensor arranged at a position that is readily influenced by the external light, as compared with the first sensor, the decision unit decides a correction value corresponding to each of the first sensor and the second sensor, and if the determination unit determines that there is the influence of the external light, the decision unit decides the correction value corresponding to the first sensor and the correction value corresponding to the second sensor based on the received light amount of the first sensor.

According to another aspect of the present invention, there is provided a control method for an image scanning apparatus including an image scanning unit in which a plurality of sensors for scanning an original and a plurality of light sources are arranged in a predetermined direction, the method comprising: determining whether there is an influence of external light from the outside of the image scanning apparatus on scanning by the image scanning unit; deciding a correction value corresponding to each of the plurality of sensors based on received light amounts of at least some of the plurality of sensors; and correcting, using the correction value corresponding to each of the plurality of sensors and decided in the deciding, data corresponding to a received light amount of each of the plurality of sensors when scanning the original, wherein in the deciding, if it is determined in the determining that there is no influence of the external light, based on a received light amount of each of a first sensor and a second sensor arranged at a position that is readily influenced by the external light, as compared with the first sensor, a correction value corresponding to each of the first sensor and the second sensor is decided, and if it is determined in the determining that there is the influence of the external light, the correction value corresponding to the first sensor and the correction value corresponding to the second sensor are decided based on the received light amount of the first sensor.

According to the present invention, it is possible to appropriately reduce the influence of external light on scanning of an original.

Further features of the present invention will become apparent from the following description of exemplary embodiments (with reference to the attached drawings).

DESCRIPTION OF THE EMBODIMENTS

An embodiment for carrying out the present invention will be described with reference to the accompanying drawings. Note that the embodiment to be described below is not intended to limit the present invention, and is merely an example.

First Embodiment

[Apparatus Arrangement]

Figure 1:
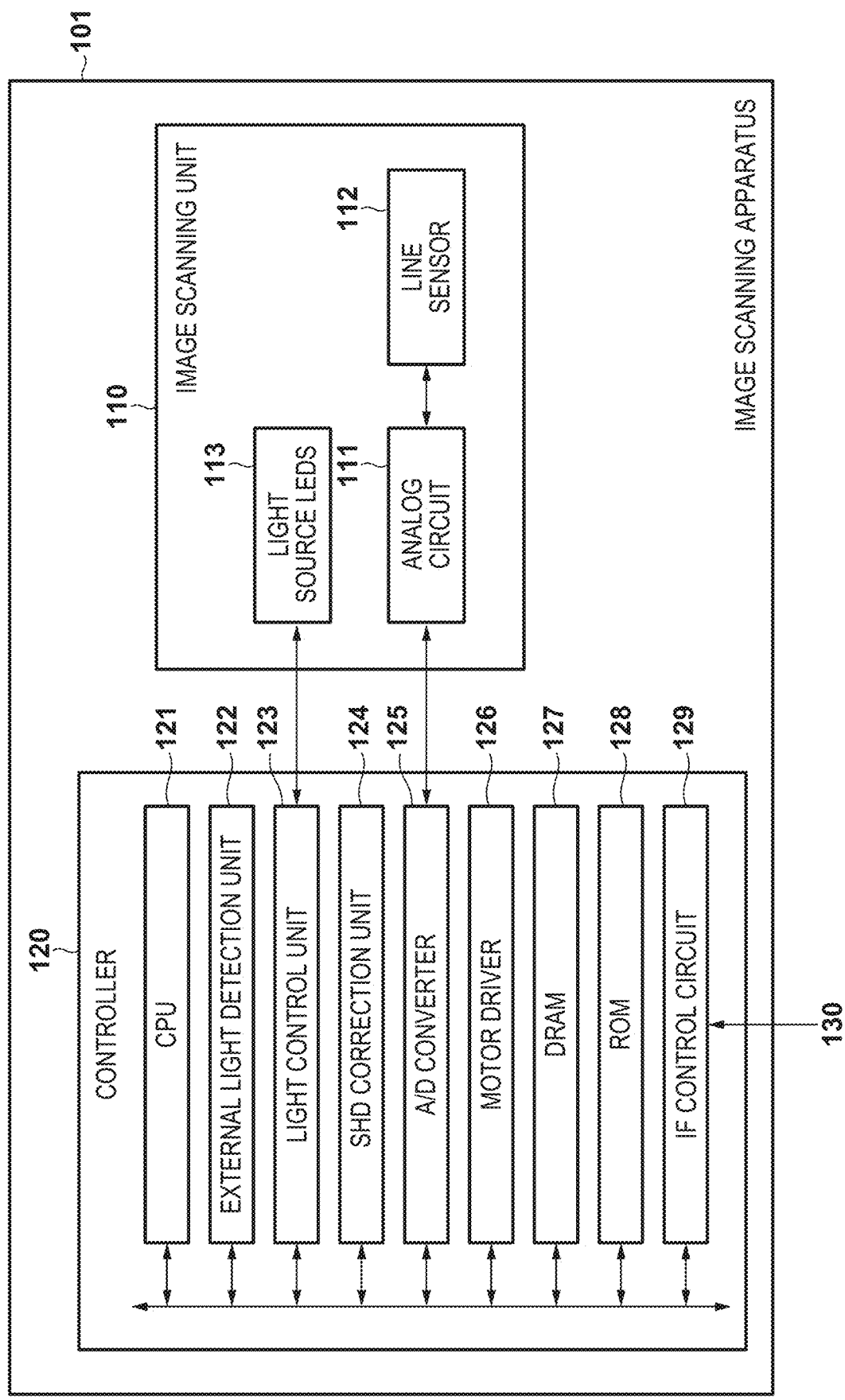
FIG. 1 is a block diagram showing an example of the arrangement of an image scanning apparatus according to the present invention.

FIG. 1 is a block diagram showing an example of the arrangement of a flatbed image scanning apparatus as an image scanning apparatus according to this embodiment. Referring to FIG. 1, an image scanning apparatus 101 is formed by including an image scanning unit 110 and a controller 120. The image scanning unit 110 includes an analog circuit 111, a line sensor 112, and light source LEDs 113. The line sensor 112 is formed from image sensors each for converting image information into an electrical signal by photoelectrically converting light. Each light source LED 113 is an LED serving as a light source that illuminates an original to be scanned when the line sensor 112 scans an image. In this example, in correspondence with color scanning, the light sources corresponding to respective colors are provided. Note that in the line sensor 112, a plurality of image sensors are arranged in the main-scanning direction, and light source LEDs are also arranged in the main-scanning direction. The analog circuit 111 performs analog processing for an image signal output from the line sensor 112, and outputs the thus obtained signal as an analog signal to the controller 120.

The controller 120 is formed by including a CPU 121, an external light detection unit 122, a light control unit 123, a shading correction unit 124, an A/D converter 125, a motor driver 126, a DRAM 127, a ROM 128, and an I/F control circuit 129. In the controller 120, the respective portions are communicably connected to each other. The A/D converter 125 A/D-converts the analog signal output from the analog circuit 111, and sends the digitized image signal to the processing unit of the succeeding stage. The DRAM 127 is a volatile storage area, and saves various data such as an image signal and correction data. The CPU 121 controls the overall image scanning apparatus 101. The ROM 128 is a nonvolatile storage area, and saves information in which the operation order of the CPU 121 is described. The motor driver 126 controls a motor that operates an optical unit on which the line sensor 112 and the like are mounted. The I/F control circuit 129 transmits/receives data to/from a host computer 130 such as a PC (Personal Computer). The external light detection unit 122 determines whether external light is incident on the line sensor 112. Based on a determination result by the external light detection unit 122, the light control unit 123 performs light control for light beams emitted by the light source LEDs 113. In this embodiment, assume that a light control range (position) can be changed in the main-scanning direction in which the light source LEDs are arranged in the line sensor 112. The shading correction unit 124 performs shading correction based on the determination result by the external light detection unit 122.

Figure 2:
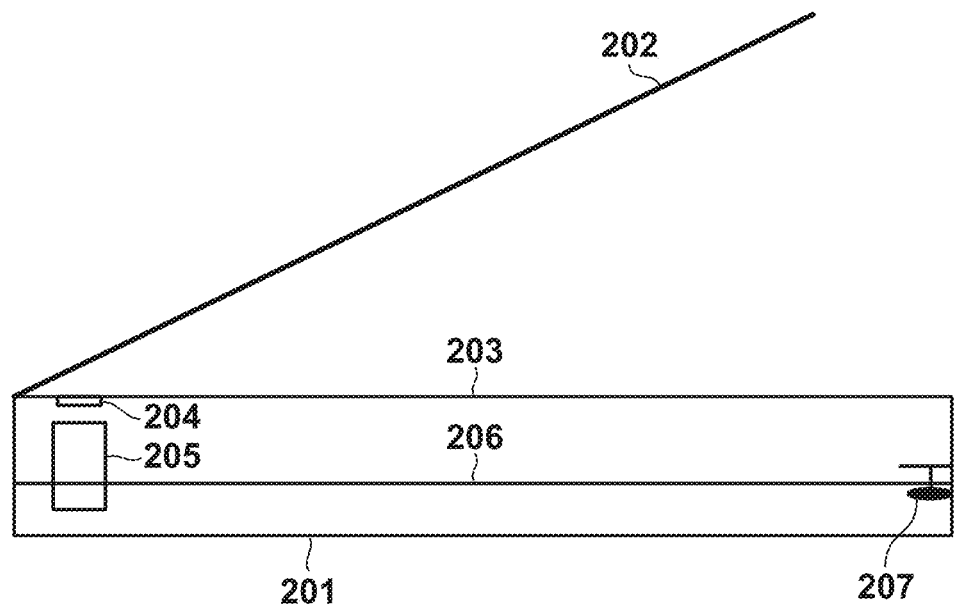
FIG. 2 is a view showing the schematic arrangement of the image scanning apparatus according to the present invention.

FIG. 2 is a schematic sectional view of a flatbed image scanning apparatus according to this embodiment. An image scanning apparatus 201 shown in FIG. 2 corresponds to the image scanning apparatus 101 shown in FIG. 1. A press plate 202 is arranged in an upper portion of the image scanning apparatus 201, and is used to prevent light incident from the outside at the time of scanning of an image. A platen glass 203 is an original table on which an original to be scanned is placed. By closing the press plate 202, the original placed on the platen glass 203 is pressed from above. A CIS (Contact Image Sensor) module 205 functions as an optical unit, and performs scanning by moving in the sub-scanning direction when scanning the original on the platen glass 203. The CIS module 205 is provided with the line sensor 112 along the main-scanning direction. In FIG. 2, assume that the horizontal direction indicates the sub-scanning direction and the depth direction indicates the main-scanning direction. A white reference plate 204 is used to acquire data (to be referred to as shading data hereinafter) used for shading correction. A shaft 206 is a shaft used when moving the CIS module 205 in the sub-scanning direction. A driving unit 207 is a driving unit used to move the CIS module 205 along the shaft 206. The driving unit 207 is formed by including a motor.

Figure 3:
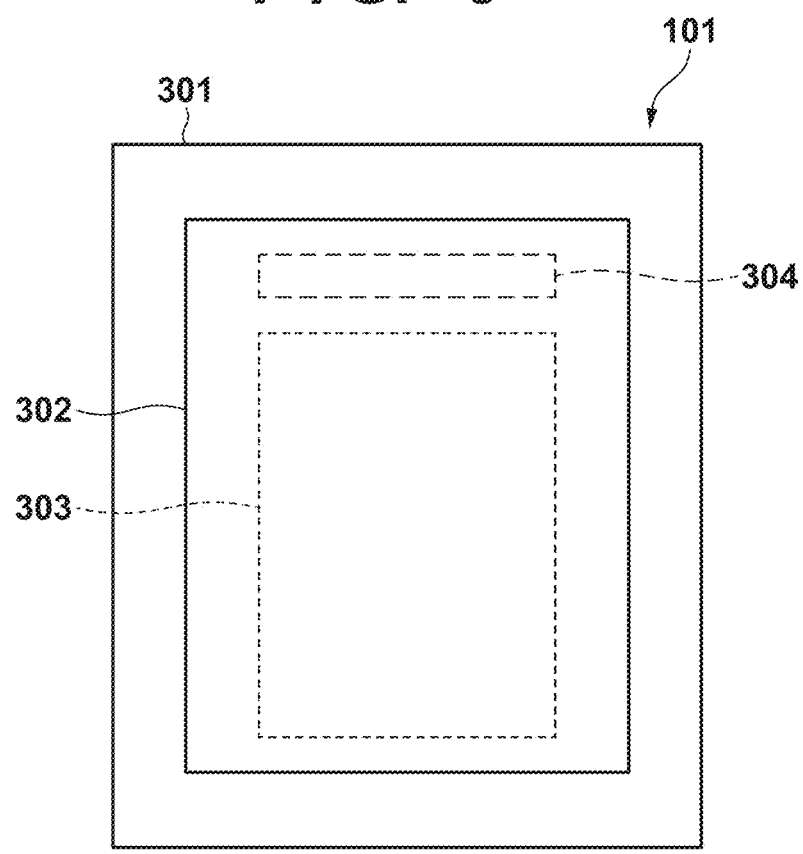
FIG. 3 is a view showing the schematic arrangement of an image scanning unit according to the present invention.

FIG. 3 is a schematic view when observing the image scanning apparatus 101 from above according to this embodiment. In FIG. 3, assume that the horizontal direction indicates the main-scanning direction, and the vertical direction indicates the sub-scanning direction. FIG. 3 shows a press plate 301, a platen glass 302, and an original scanning area 303. The original scanning area 303 is an area where an original is actually scanned in the region of the platen glass 302. An area 304 is an area for line shading, in which the white reference plate 204 with uniform density is arranged.

[Processing Sequence]

Figure 4:
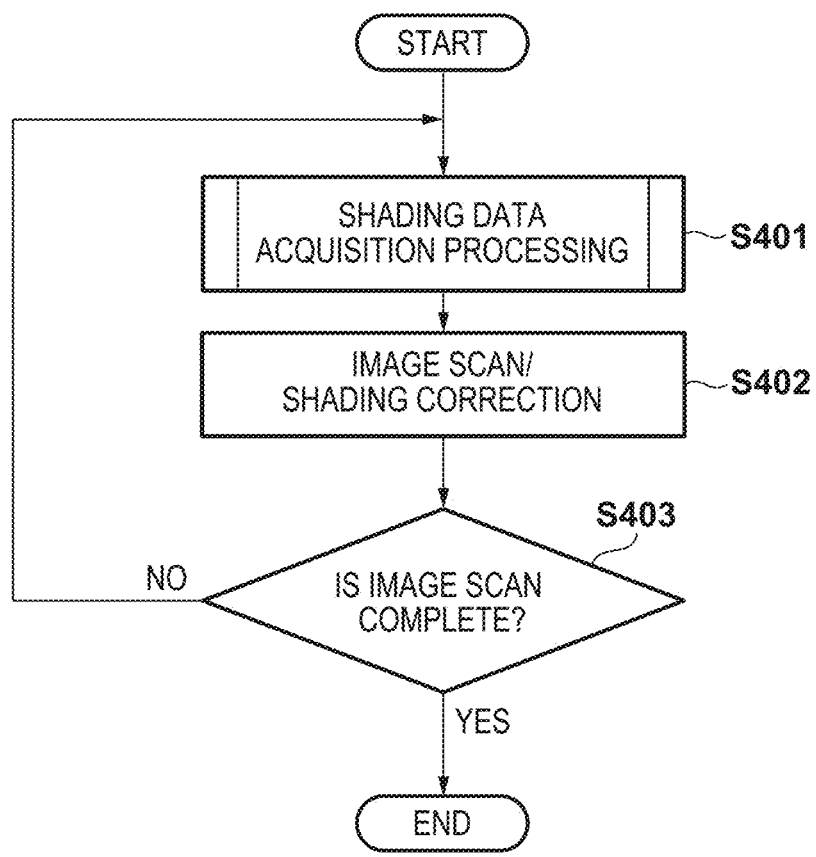
FIG. 4 is a flowchart of an image scanning operation according to the present invention.

FIG. 4 is a flowchart for explaining the basic operation of the image scanning apparatus 101 according to this embodiment. This processing sequence is implemented when, for example, the CPU 121 performs control based on a program stored in the ROM 128. This embodiment assumes that before this processing starts, an original to be scanned is placed on the platen glass 203 and the press plate 202 is closed.

In step S401, the image scanning apparatus 101 performs shading data acquisition processing. Shading data is data used to cancel the individual difference of each of the plurality of image sensors arranged in the line sensor 112. More specifically, the shading data is a correction value used to make, closer to an ideal value in a state in which light beams are or are not emitted from the light source LEDs 113, a value obtained when each image sensor receives light in the state. The shading data is acquired for each image sensor. This step will be described in detail later with reference to FIG. 5.

In step S402, the image scanning apparatus 101 scans an image. At this time, shading correction is performed for the scanned image using the shading data acquired in the processing of step S401. More specifically, in the scanned image, a value obtained by a given image sensor is corrected by the shading data acquired for the image sensor.

In step S403, the image scanning apparatus 101 determines whether the image scanning processing is complete. If it is determined that the image scanning processing is complete (YES in step S403), this processing sequence ends; otherwise (NO in step S403), the process advances to step S401 to continue the processing.

(Shading Data Acquisition Processing)

Figure 5:
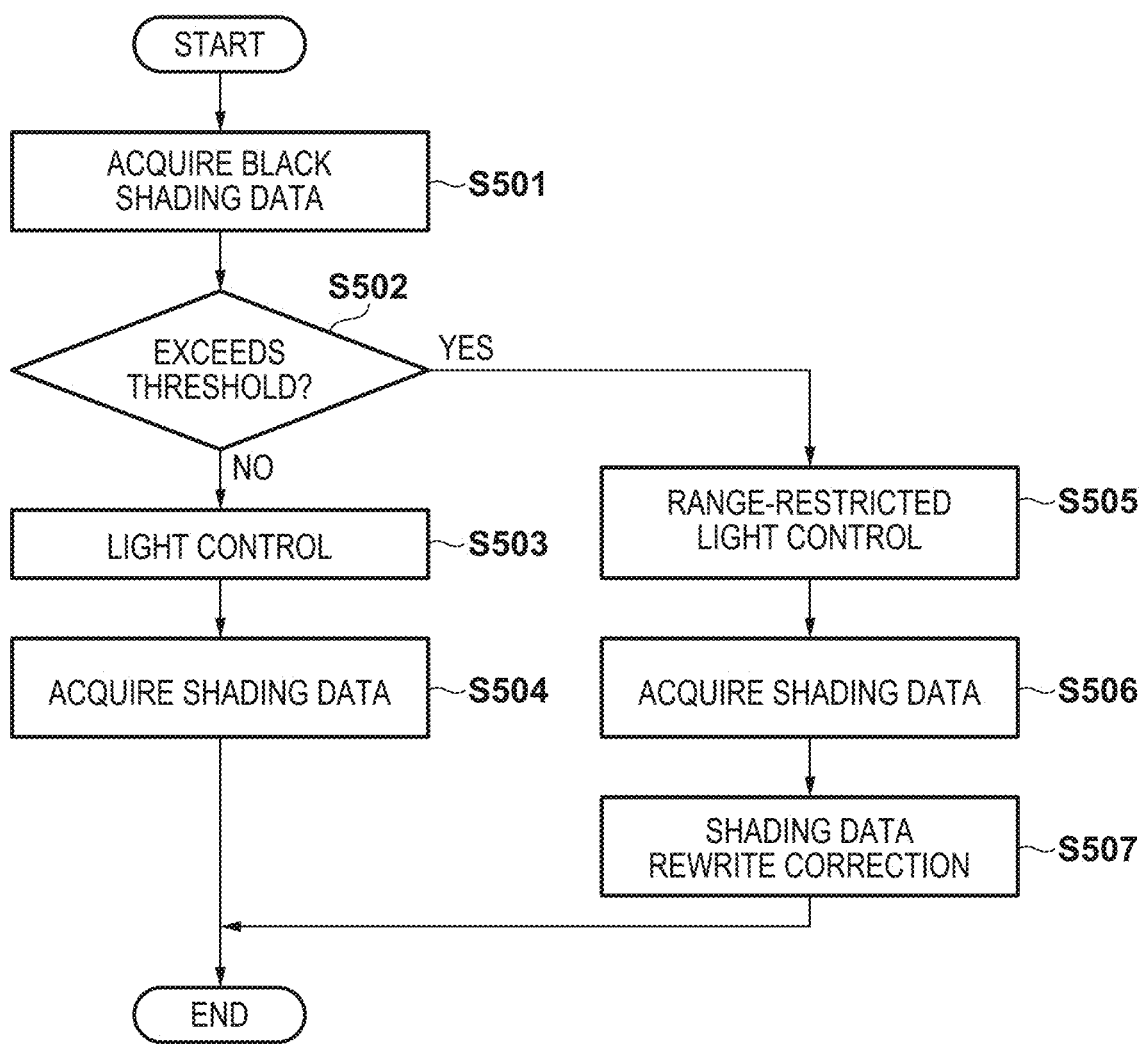
FIG. 5 is a flowchart of shading data acquisition processing according to the present invention.

FIG. 5 is a flowchart of the shading data acquisition processing according to this embodiment. This corresponds to the processing in step S401 of FIG. 4.

In step S501, the image scanning apparatus 101 acquires black shading data. In the example shown in FIG. 2, original data for acquiring shading data is data obtained by scanning the white reference plate 204 provided on the back side (the side of the CIS module 205) of the platen glass 203. If the white reference plate 204 is scanned by the CIS module 205, a uniform value is output ideally since the white reference plate 204 has uniform density. However, in fact, a nonuniform value is output as scanned data due to various factors. To cope with this, shading data is calculated as a coefficient for correcting nonuniformity. As described above, assume that the original to be scanned is placed on the platen glass 203 and the press plate 202 is closed. The black shading data is obtained by scanning the white reference plate 204 by the CIS module 205 in a state in which the light source LEDs 113 serving as light sources are turned off. On the other hand, white shading data can be obtained by scanning the white reference plate 204 by the CIS module 205 in a state in which the press plate 202 is closed and the light source LEDs 113 are turned on. An example in which shading correction according to this embodiment is performed using both the black shading data and the white shading data will be described.

In step S502, the image scanning apparatus 101 determines the presence/absence of external light. That is, in step S502, it is determined whether there is the influence of external light from the outside of the scanning apparatus on scanning by the line sensor. More specifically, the image scanning apparatus 101 compares the peak value of the black shading data obtained in step S501 with a predetermined threshold, and determines whether the peak value exceeds the threshold. Assume that the threshold is set and held in advance. If external light is incident on the image scanning unit 110, the peak value of the black shading data acquired in step S501 largely exceeds the threshold. Thus, if the peak value exceeds the threshold, it is determined that there is the influence of the external light from the outside of the image scanning apparatus 101 on scanning by the line sensor. Therefore, if the peak value of the black shading data acquired in step S501 exceeds the threshold, exception processing (steps S505 to S507) is performed to reduce the influence of the external light. If it is determined that the threshold is exceeded (YES in step S502), the process advances to step S505; otherwise (NO in step S502), the process advances to step S503.

In step S503, the image scanning apparatus 101 performs light control for the entire region in the main-scanning direction. Light control indicates adjustment of the emitted light amounts of the light source LEDs 113. More specifically, the image scanning apparatus 101 causes each light source LED 113 to emit light, and causes each image sensor arranged in the line sensor 112 to receive reflected light from the white reference plate 204. Then, the image scanning apparatus 101 compares a measurement value representing an actually received light amount with the ideal value of the received light amount, and adjusts the emitted light amount of the light source LED 113 so that the measurement value becomes close to the ideal value.

At this time, the emitted light amount is adjusted in consideration of the position of the light source LED and the position of the image sensor in the main scanning direction. That is, if the image sensor arranged at a given position in the main-scanning direction measures a received light amount larger than the ideal value, adjustment is performed to decrease the emitted light amount of the light source LED 113 arranged near the image sensor in the main-scanning direction. On the other hand, if the image sensor arranged at another position in the main-scanning direction measures a received light amount smaller than the ideal value, adjustment is performed to increase the emitted light amount of the light source LED 113 arranged near the image sensor in the main-scanning direction. In step S503, light control is performed for all the light source LEDs 113.

The above-described light control processing may be repeatedly performed. That is, after the emitted light amount of the light source LED 113 is roughly adjusted by the first light control processing, the image scanning apparatus 101 causes the light source LED 113 to emit light again, and causes the image sensor arranged in the line sensor 112 to receive reflected light from the white reference plate 204. Then, adjustment of the emitted light amount is re-executed. By repeating the light control processing in this way, fine adjustment can be performed after the emitted light amount of the light source LED 113 is roughly adjusted.

In step S504, the image scanning apparatus 101 acquires white shading data and black shading data in a state in which the light control processing in step S503 has been performed. A method of acquiring each shading data is the same as the method described in step S501. In step S504, white shading data and black shading data are acquired for all the image sensors arranged in the line sensor 112. Note that if step S504 is executed, it is assumed that there is no influence of the external light. If image scanning is performed in a state in which it is determined that there is no external light, the black shading data and the white shading data acquired in step S504 are used. Then, this processing sequence ends.

On the other hand, if it is determined in step S502 that the peak value of the black shading data acquired in step S501 largely exceeds the threshold, that is, if it is determined that there is the influence of the external light, processing in step S505 is executed. In step S505, the image scanning apparatus 101 performs range-restricted light control. In range-restricted light control, light control is performed by restricting a range in the main-scanning direction. More specifically, adjustment of the emitted light amount described in step S502 is not performed for the light source LED 113 arranged at a position that is influenced by the external light at a high possibility among the plurality of light source LEDs 113 arranged in the main-scanning direction. On the other hand, adjustment of the emitted light amount is performed for the light source LED arranged at a position that is influenced by the external light at a low possibility.

Among the plurality of light source LEDs 113, as for the image sensor arranged at a position that is influenced by the external light at a high possibility, a received light amount caused by the external light may be added to the received light amount caused by light emitted from the light source LED 113. Therefore, if the emitted light amount of the light source LED 113 arranged near the image sensor in the main-scanning direction is adjusted, the emitted light amount may be adjusted to an emitted light amount smaller than the actual emitted light amount after adjustment. To cope with this, in step S505, the range of the light source LEDs 113 where light control is performed is restricted in the main-scanning direction. Based on the black shading data acquired in step S501, the image scanning apparatus 101 specifies, using the external light detection unit 122, a portion where data values vary due to the external light. Furthermore, by using the light control unit 123, the image scanning apparatus 101 controls not to use, for light control, a range in the main scanning direction corresponding to the data varying portion. A practical method will be described later with reference to FIG. 8.

In step S506, the image scanning apparatus 101 acquires shading data. More specifically, the image scanning apparatus 101 acquires black shading data and white shading data under a situation in which control is performed by range-restricted light control in step S505. Note that in step S506, black shading data and white shading data may be acquired for all the image sensors arranged in the line sensor 112. Alternatively, black shading data and white shading data may be acquired only for the image sensors arranged in the range restricted in step S505 in the main-scanning direction.

In step S507, the image scanning apparatus 101 rewrites data for each of the black shading data and the white shading data obtained in step S506. More specifically, the shading data acquired for the image sensor arranged at a position that is hardly influenced by the external light among the plurality of image sensors arranged in the line sensor 112 are specified. Using the specified shading data, processing of rewriting the shading data corresponding to the image sensor arranged at a position that is readily influenced by the external light is performed. Note that practical examples of the positions which are hardly and readily influenced by the external light in the main-scanning direction will be described later with reference to the accompanying drawings.

As described above, the range-restricted light control processing is performed in step S505. However, it is impossible to avoid all the influence of the external light. More specifically, the white shading data and the black shading data obtained in step S506 unwantedly increase (become close to white) in data values in a specific portion in the main-scanning direction. To cope with this, in this embodiment, data is overwritten for each of the black shading data and the white shading data acquired in the processing of step S506. Note that the individual differences among the plurality of image sensors in the same line sensor may be smaller than the individual differences of the image sensors between the plurality of line sensors. Therefore, in step S507 described above, with respect to the predetermined image sensor arranged at the position that is readily influenced by the external light, the shading data based on the received light amount of the image sensor are not reflected. Since, however, the shading data for another image sensor having characteristics close to those of the image sensor and arranged in the same line sensor are overwritten, even if there is the influence of the external light, it is possible to acquire appropriate shading data.

Note that when performing overwriting processing, the data values may be overwritten directly or overwritten using an average value. By performing such correction processing, it is possible to correct, to the normal state, the shading data which have changed due to the influence of the external light. Therefore, when scanning an image under the influence of the external light, the black shading data and the white shading data after correction in step S507 are used. Then, this processing sequence ends.

In the case of color scanning, the above processing is performed for shading data of each of three colors of RCH (red), GCH (green), and BCH (blue). Note that when acquiring shading data corresponding to each color, the light source (LED) corresponding to each color is used.

With the processing described with reference to FIG. 5, in step S402, shading correction is executed using the shading data overwritten in step S507 for the image sensor arranged at the position that is readily influenced by the external light. That is, the received light amount of the sensor arranged at the position that is hardly influenced by the external light is applied to shading correction for the sensor as well as shading correction for the sensor arranged at the position that is readily influenced by the external light.

Furthermore, as described above, based on the received light amounts of at least some of the plurality of image sensors, shading data corresponding to each of the plurality of image sensors are decided. More specifically, if there is no influence of the external light, shading data of each image sensor are decided based on the received light amount of each image sensor in step S504. On the other hand, if there is the influence of the external light, shading data are decided, in step S507, for the sensor arranged at the position that is readily influenced by the external light, based on the received light amount of another sensor. That is, shading data are decided, for the sensor arranged at the position that is readily influenced by the external light, based on the actually received light amount of another sensor arranged in the same line sensor. Therefore, for the sensor arranged at the position that is readily influenced by the external light, for example, more appropriate shading data can be decided, as compared with a case in which predetermined shading data are used.

In this embodiment, as the correction values such as shading data and the correction method in step S402, various correction values and various correction methods can be used. For example, correction may be performed using correction values for correcting a value indicating the received light amount of each image sensor. Alternatively, correction may be performed using correction values for correcting a luminance value and density value calculated based on the received light amount of each image sensor. In either case, correction values can be decided based on the received light amount of each image sensor.

Note that the overwriting processing need not be performed in step S507. For example, every time shading correction is performed in step S402, shading data corresponding to the image sensor arranged at a position that is hardly influenced by the external light are read out. Then, the readout data may be used for shading correction for the image sensor arranged at a position that is readily influenced by the external light.

[Practical Example of Shading Data Rewriting Correction]

FIGS. 6A, 6B, 7A, and 7B are graphs for explaining shading data rewriting correction according to this embodiment. An example when color scanning is performed will be described here. In this embodiment, shading data rewriting correction is executed for each of the black shading data and the white shading data acquired in step S506 of FIG. 5 after range-restricted light control. That is, black shading data and white shading data for a position that is largely influenced by the external light are overwritten with black shading data and white shading data for a position that is hardly influenced by the external light.

Figure 6A:
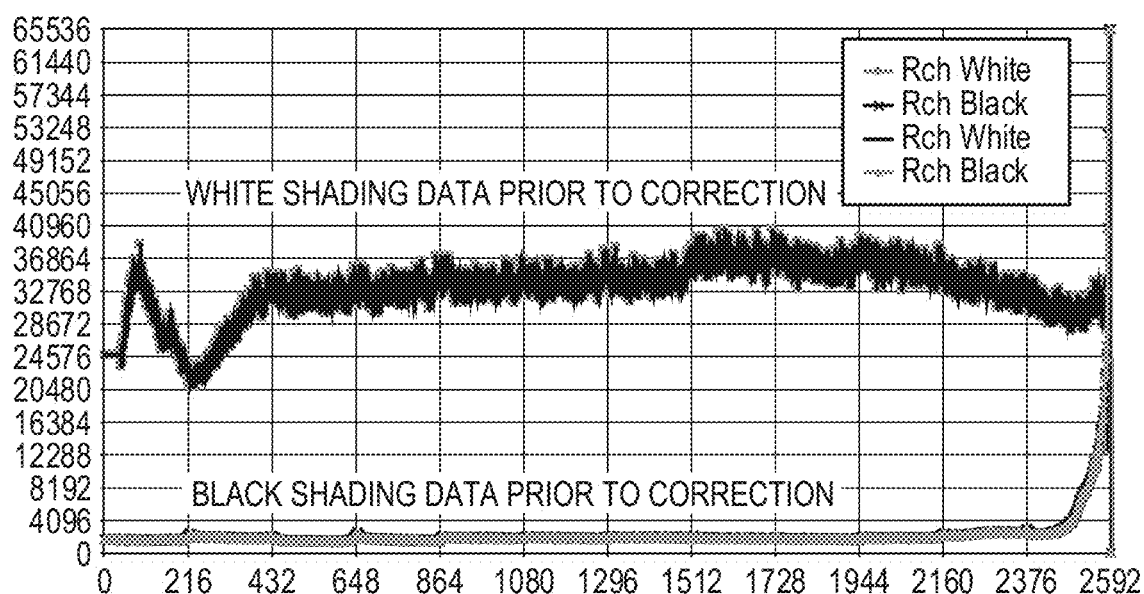
FIGS. 6A and 6B are graphs for explaining shading data according to the present invention.
Figure 6B:
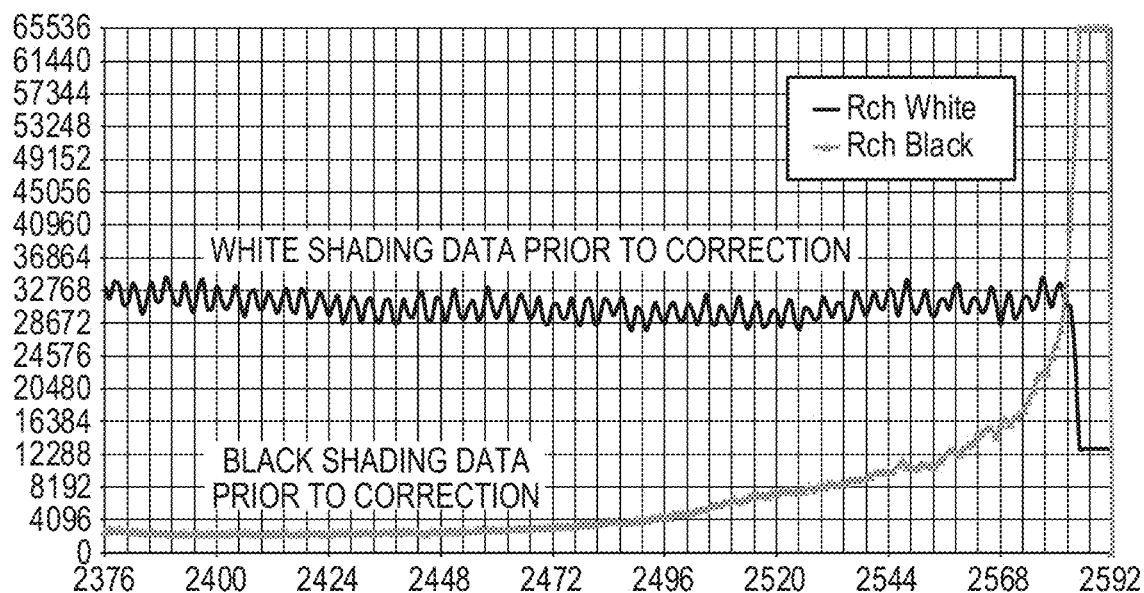
Figure 7A:
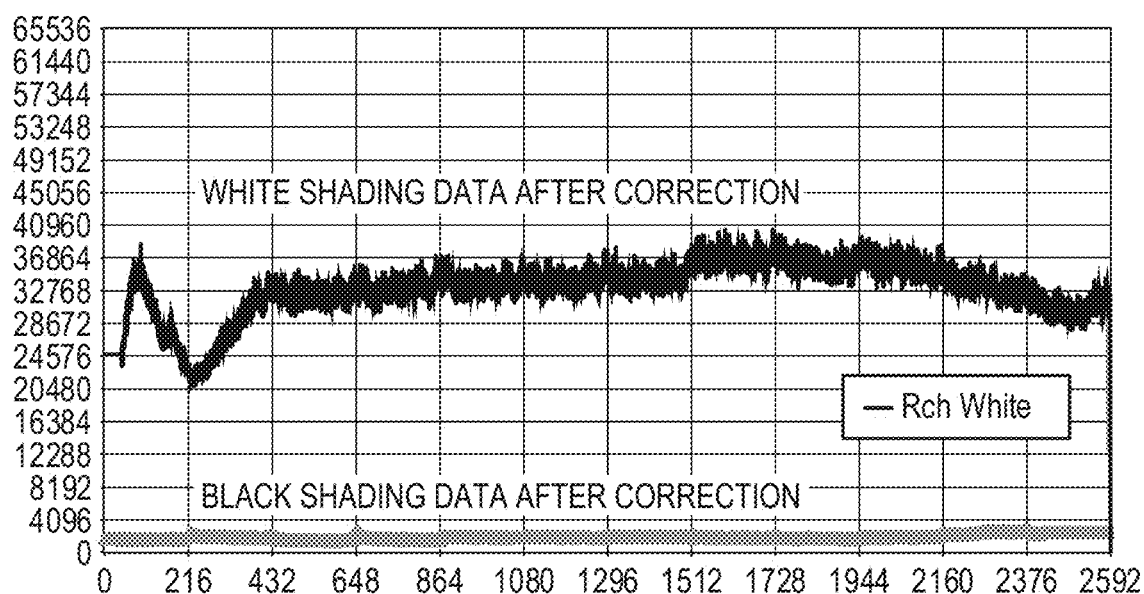
FIGS. 7A and 7B are graphs for explaining shading data according to the present invention.
Figure 7B:
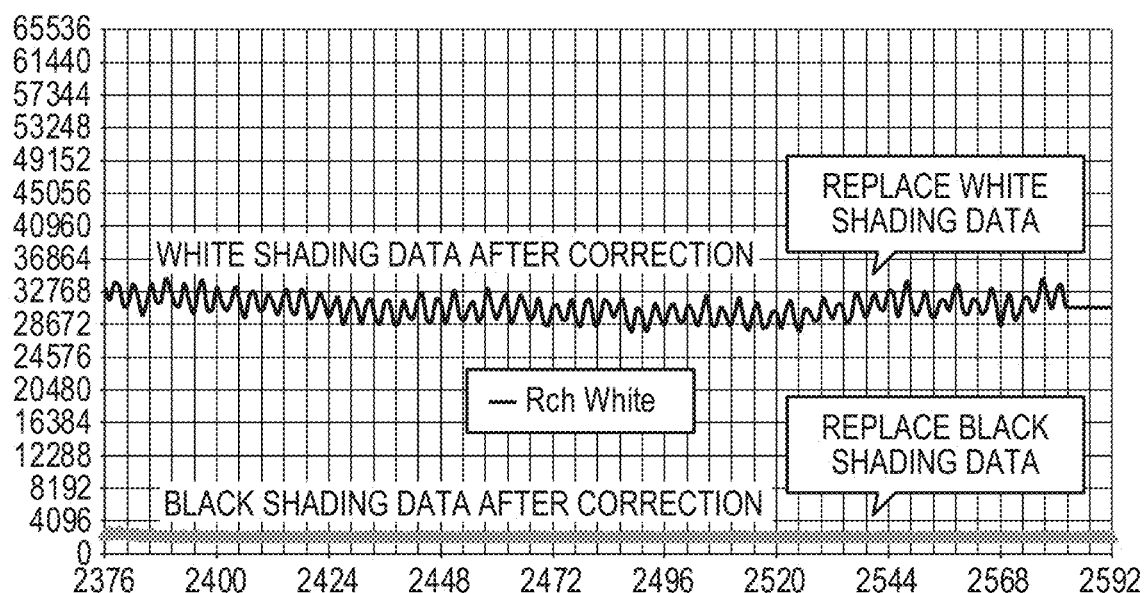

FIGS. 6A and 6B show examples of the shading data before correction acquired in step S506. The ordinate represents the value of the shading data and the abscissa represents the position of the CIS module 205 (line sensor 112) in the main-canning direction. FIGS. 7A and 7B show the shading data after correction by the processing in step S507. The ordinate represents the value of the shading data and the abscissa represents the position of the CIS module 205 (line sensor 112) in the main-scanning direction. FIGS. 6A and 7A show the white shading data and the black shading data corresponding to the respective colors. FIGS. 6B and 7B are enlarged views each obtained by extracting only the white shading data and the black shading data corresponding to red (RCH) among the white shading data and the black shading data corresponding to the respective colors in each of FIGS. 6A and 7A.

FIGS. 6A and 6B show examples of the white shading data and the black shading data acquired in step S506 after changing the area where light control is executed by performing range-restricted light control in step S505 of FIG. 5. When performing shading data rewriting correction processing for the data, data values may be overwritten directly or overwritten using an average value.

If the line sensor 112 is influenced by the external light, the black shading data and the white shading data present the same change tendency although absolute values are different. Therefore, it is possible to use, as data used for rewriting correction, the values, for the position that is hardly influenced by the external light, of the black shading data and the white shading data acquired in step S506.

In the main-scanning direction, various methods may be used to specify a range where the shading data are not overwritten (that is, a range where the influence of the external light is small) and a range where the shading data are overwritten (that is, a range where the influence of the external light is large). For example, a range where the influence of the external light is large may be determined as a fixed value in the main-scanning direction, and the determination processing based on the threshold in step S502 and the data overwriting processing in step S507 may be executed for the range determined by the fixed value. That is, the position of the sensor that is readily influenced by the external light may be determined as a predetermined position.

Alternatively, the range where the shading data are not overwritten (that is, the range where the influence of the external light is small) and the range where the shading data are overwritten (that is, the range where the influence of the external light is large) may be specified based on the shading data acquired for all the image sensors in step S506. More specifically, the black shading data acquired in step S506 is compared with threshold B, and the white shading data is compared with threshold C. Then, a range where the black shading data is equal to or larger than threshold B or the white shading data is equal to or larger than threshold C may be specified as the range where the influence of the external light is large.

For example, in the example of the white shading data shown in FIG. 6B, the range from a position of "2376" to a position of "2568" where the output value hardly varies is determined as the range where the influence of the external light is small, and a value in this range or an average value is used as a value for the range where the influence of the external light is large. In the example of the white shading data shown in FIG. 6B, the range where the influence of the external light is large corresponds to, for example, the range from a position of "2580" to a position of "2592".

Similarly, in the example of the black shading data shown in FIG. 6B, the range from a position "2376" to a position of "2472" where the output value hardly varies is determined as the range where the influence of the external light is small, and a value in this range or an average value is used as a value for the range where the influence of the external light is large. In the example of the black shading data shown in FIG. 6B, a portion corresponds to, for example, the range from a position of "2472" to a position of "2592". Note that a method of determining a range where the influence of the external light is large (small) is not specifically limited. However, a variation value or a threshold for a difference from a reference value may be used.

By performing such correction processing for the shading data, it is possible to correct, to the normal state, the shading data which have changed due to the influence of the external light. As a result, it is possible to obtain the black shading data and the white shading data while suppressing the influence of the external light. When scanning an image under the influence of the external light, the black shading data and the white shading data after correction in step S507 are used.

FIGS. 7A and 7B show the examples of the black shading data and the white shading data after correction in step S507 of FIG. 5.

[Change of Light Control Range]

Figure 8:
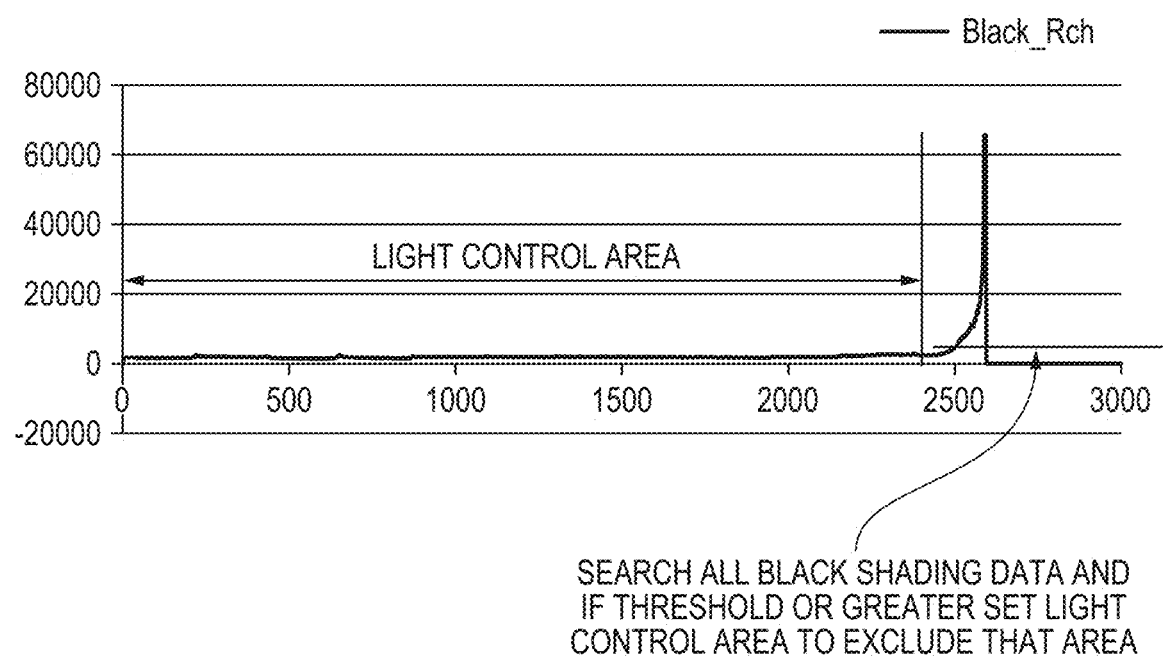
FIG. 8 is a graph for explaining setting of a light control range according to the present invention.

FIG. 8 is a graph for explaining an operation of deciding a range where light control is performed, in the range-restricted light control processing performed in step S505 of FIG. 5. Assume that in step S501 of FIG. 5, the black shading data shown in FIG. 8 is acquired. In FIG. 8, the horizontal direction indicates the position of the line sensor 112 in the main-scanning direction, and the vertical direction indicates the value of the detected black data. In FIG. 8, an almost constant value is shown in a portion from "0" to "2500" on the abscissa but a value abruptly rises after exceeding "2500". At this time, assume that a value after the position of "2500" in the main-scanning direction exceeds a preset threshold. In this case, a portion of a predetermined range adjacent to a position where threshold A is exceeded is set as a range where no light control is performed. In other words, a portion except for the above predetermined range is set as a light control target range (light control area). In the example of FIG. 8, a portion from "0" to "2400" in the main-scanning direction is set as a light control target range.

Note that the range set as the light control target area in step S505 may be processed as the range where the influence of the external light is small (the range where the shading data are not overwritten) in step S507. In this case, a range except for the light control target area serves as a shading data correction target area as the range where the influence of the external light is large.

According to this embodiment, even if a thick original such as a dictionary is scanned, a defect in a scanned image caused by the incident external light can be prevented by relatively simple processing. As a result, it is possible to achieve both scanning image quality and productivity.

Other Embodiments

Note that the flatbed image scanning apparatus (scanner) having only the image scanning function has been explained as an application example of the present invention. However, the present invention is not limited to this arrangement, and can be equally implemented by, for example, an MFP (Multi-Function Peripheral) having an image scanning function and a printing mechanism.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-042303, filed Mar. 8, 2018, which is hereby incorporated by reference herein in its entirety.

What is claimed is:

1. An image scanning apparatus including an image scanning unit in which a plurality of sensors for scanning an original and a plurality of light sources are arranged in a predetermined direction, comprising:
   a determination unit configured to determine whether there is an influence of external light from the outside of the image scanning apparatus on scanning by the image scanning unit;
   a decision unit configured to decide a correction value corresponding to each of the plurality of sensors based on received light amounts of at least some of the plurality of sensors; and
   a correction unit configured to correct, using the correction value corresponding to each of the plurality of sensors and decided by the decision unit, data corresponding to a received light amount of each of the plurality of sensors when scanning the original,
   wherein if the determination unit determines that there is no influence of the external light, based on a received light amount of each of a first sensor and a second sensor arranged at a position that is readily influenced by the external light, as compared with the first sensor, the decision unit decides a correction value corresponding to each of the first sensor and the second sensor, and
   if the determination unit determines that there is the influence of the external light, the decision unit decides the correction value corresponding to the first sensor and the correction value corresponding to the second sensor based on the received light amount of the first sensor.

2. The apparatus according to claim 1, wherein based on the received light amounts of the plurality of sensors, the determination unit determines whether there is the influence of the external light on scanning by the image scanning unit.

3. The apparatus according to claim 2, wherein based on the received light amounts of the plurality of sensors in a state in which the plurality of light sources are prevented from emitting light beams, the determination unit determines whether there is the influence of the external light.

4. The apparatus according to claim 1, wherein based on the received light amounts of the plurality of sensors, the determination unit determines the second sensor arranged at the position that is readily influenced by the external light in scanning of the original.

5. The apparatus according to claim 4, wherein based on the received light amounts of the plurality of sensors in the state in which the plurality of light sources are prevented from emitting light beams and the received light amounts of the plurality of sensors in a state in which the plurality of light sources are made to emit light beams, the determination unit determines the second sensor.

6. The apparatus according to claim 1, wherein the second sensor is a sensor arranged at a predetermined position as the position that is readily influenced by the external light, as compared with the first sensor.

7. The apparatus according to claim 1, further comprising a light control unit configured to adjust an emitted light amount of at least one of the plurality of light sources,
   wherein if the determination unit determines that there is the influence of the external light, the light control unit restricts a range of the light sources whose emitted light amounts are to be adjusted in the predetermined direction, as compared with a case in which the determination unit does not determine that there is the influence of the external light.

8. The apparatus according to claim 7, wherein if the determination unit determines that there is the influence of the external light, the light control unit restricts the range of the light sources whose emitted light amounts are to be adjusted in the predetermined direction so an emitted light amount of a light source arranged at a position corresponding to the second sensor is not adjusted.

9. The apparatus according to claim 8, wherein
   the image scanning apparatus includes a white reference plate, and
   the decision unit decides the correction value corresponding to each of the plurality of sensors based on the received light amounts of at least some of the plurality of sensors in a state in which the plurality of light sources emit light beams to the white reference plate.

10. The apparatus according to claim 9, wherein the decision unit decides the correction value corresponding to each of the plurality of sensors based on the received light amounts of at least some of the plurality of sensors in the state in which the plurality of light sources emit light beams to the white reference plate and the received light amounts of at least some of the plurality of sensors in a state in which the plurality of light sources emit no light beams.

11. The apparatus according to claim 9, wherein the decision unit decides the correction value corresponding to each of the plurality of sensors based on the received light amounts of at least some of the plurality of sensors in a state in which the plurality of light sources whose emitted light amounts have been adjusted by the light control unit emit light beams to the white reference plate.

12. The apparatus according to claim 1, wherein the image scanning apparatus comprises a flatbed image scanning apparatus.

13. A control method for an image scanning apparatus including an image scanning unit in which a plurality of sensors for scanning an original and a plurality of light sources are arranged in a predetermined direction, the method comprising:
   determining whether there is an influence of external light from the outside of the image scanning apparatus on scanning by the image scanning unit;
   deciding a correction value corresponding to each of the plurality of sensors based on received light amounts of at least some of the plurality of sensors; and
   correcting, using the correction value corresponding to each of the plurality of sensors and decided in the deciding, data corresponding to a received light amount of each of the plurality of sensors when scanning the original, wherein in the deciding, if it is determined in the determining that there is no influence of the external light, based on a received light amount of each of a first sensor and a second sensor arranged at a position that is readily influenced by the external light, as compared with the first sensor, a correction value corresponding to each of the first sensor and the second sensor is decided, and if it is determined in the determining that there is the influence of the external light, the correction value corresponding to the first sensor and the correction value corresponding to the second sensor are decided based on the received light amount of the first sensor.

\* \* \* \* \*